United States Patent [19]

Ingram

[11] Patent Number: 4,609,681

[45] Date of Patent: Sep. 2, 1986

[54] ANTI-LUMPING STYRENE POLYMER PARTICLES FOR MOLDING FOAMS

[75] Inventor: Alvin R. Ingram, West Chester, Pa.

[73] Assignee: Atlantic Richfield Company, Los Angeles, Calif.

[21] Appl. No.: 818,312

[22] Filed: Jan. 13, 1986

Related U.S. Application Data

[62] Division of Ser. No. 791,478, Oct. 25, 1985.

[51] Int. Cl.[4] .................................................. C08J 9/22
[52] U.S. Cl. ........................................ 521/57; 521/56; 521/60; 521/85; 521/146
[58] Field of Search .................... 427/222; 521/56, 57, 521/60, 85; 428/407

[56] References Cited

U.S. PATENT DOCUMENTS

| 2,989,782 | 6/1961 | Barkhuff, Jr. et al. | 521/85 |
|---|---|---|---|
| 3,236,681 | 2/1966 | Nemphos et al. | 521/85 |
| 3,520,833 | 7/1970 | Wright | 521/85 |
| 3,553,112 | 1/1971 | Weinstein et al. | 521/85 |
| 3,826,765 | 7/1974 | Altares, Jr. | 521/85 |
| 3,879,345 | 4/1975 | Furukawa et al. | 521/85 |

Primary Examiner—Morton Foelak
Attorney, Agent, or Firm—Lewis J. Young

[57] ABSTRACT

Expandable styrene polymer particles which have anti-stratification and anti-lumping properties during expansion are produced by dry blending styrene polymer particles in the presence of 0.01–0.04 parts of alkyl and alkylaryl ethers of polyethoxyethanol mono- and diesters of phosphoric acid per 100 parts of polymer particles. The esters may be added as sole anti-stratification or anti-lumping agent or in addition to known anti-lumping agents.

5 Claims, No Drawings

ANTI-LUMPING STYRENE POLYMER PARTICLES FOR MOLDING FOAMS

This is a division of application Ser. No. 791,478, filed Oct. 25, 1985.

BACKGROUND OF THE INVENTION

This invention relates to a process for making expandable styrenic polymers anti-lumping during preexpansion by coating phosphoric acid esters of polyethoxyethanol ethers onto the expandable polymer particles by a dry blending process.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article.

The formation of molded articles from expandable styrene polymer particles is effected in two steps: (1) pre-expanding of foamable styrene polymer particles to a density of between 1 and 3 pounds per cubic foot; and (2) further heating the pre-expanded particles in a closed mold to cause further expansion and form a fused, one piece article having the shape of the mold. The second step is what is normally referred to as "molding".

The pre-expansion step may be carried out by heating the expandable polymer particles by any suitable heating medium such as steam, hot air, hot water, or radiant heat. A widely used method of pre-expansion of the particles is a process such as that disclosed in U.S. Pat. No. 3,023,175 by Rodman.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the moled articles can result and voids can occur.

Another problem is that of stratification of prepuff particles in the continuous pre-expander which clogs the opening and necessitats periodic shut-down of the pre-expander to allow clean out of the stratified, densified chunks of foam.

Various methods have been proposed for the prevention of lumping and stratification during pre-expansion, but these have all suffered from some objectionable feature such as rapid loss of blowing agent, poor flow of the treated beads, dust problems which cause plugging of the steam ports, and often serious reduction in fusion of the particles on molding. U.S. Pat. No. 3,520,833 teaches the addition of lecithin during the impregnation of the particles with the blowing agent. Unfortunately, the lecithin imparts an undesirable odor to the molded articles. U.S. Pat. No. 3,462,293 teaches to coat the particles with polymeric materials by a fluid bed process. This process involves an additional expense of fluidizing the particles and coating with the polymer latexes. U.S. Pat. No. 3,444,104 teaches the addition of calcium silico aluminate. This additive tends to foul transfer lines and molds with clay-like deposits.

SUMMARY OF THE INVENTION

It has now been found that phosphoric acid esters of polyethoxyethanol ethers, when dry blended onto the surface of expandable styrene polymer particles, serve as both an anti-lump and anti-stratification agent for the pre-expansion of the particles. Coating with from 0.01 to 0.10 parts of ester per 100 parts of polymer gives a foamable product which, when pre-expanded, exhibits less stratification than expandable styrene polymers not having the antilump agent present.

DETAILED DESCRIPTION OF THE INVENTION

In accordance with this invention, a variety of expandable thermoplastic homopolymers and copolymers can be rendered both anti-lumping and anti-stratifying. The polymers may be derived from vinyl aromatic monomers including styrene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

Especially useful are polystyrene, and copolymers of styrene with 5-30 weight percent of acrylonitrile, maleic anhydride, or methyl acid maleate.

The styrene polymers may be in the form of beads, granules, or other particles convenient for the expansion and molding operations. Especially useful are the beads formed by the suspension polymerization of the vinyl aryl monomers alone or in combination with the minor amount of copolymerizable monomers.

The styrene polymers, can, of course, be produced by any of the known techniques. The preferred method of preparation is the suspension technique, which gives essentially spherical particles.

The expandable styrene polymer particles may be prepared by impregnating the styrene polymer particles with a suitable blowing agent. The blowing agent may be added to the aqueous suspension in which the polymer particles were prepared and prior to the separation of the particles from the aqueous reaction medium.

Alternatively, particles of styrene polymer may be resuspended in an aqueous medium and impregnated with blowing agent. In this case, suspending agents are added to the water to keep the particles from agglomerating at the elevated temperatures used during the impregnation process. Suitable suspending agent systems are, for example, those described in D'Alelio U.S. Pat. No. 2,983,692, such as tricalcium phosphate in combination with an anionic surfactant.

During the impregnation of the particles with blowing agent, other additives can also be incorporated, such as internal fast-cool agents, pigments and dyes, stablizers, anti-lump agents, self-extinguishing agents, plasticizers and the like. Of course, these same additives can be added externally by dry-blending onto the impregnated particles.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4–6 carbon atoms in the molecule, such as butanes, pentanes, hexanes, and the halogenated hydrocarbons which boil at a temperature below the softening point of the polymer. Mixtures of these agents may also be used, such as a mixture of 40–60% n-pentane and 60–40% trichlorofluoromethane. Usually from 3–20% of blowing agent per 100 parts of polymer is incorporated by the impregnation.

The esters suitable for the present invention are composed of mono- and diesters having the general formula

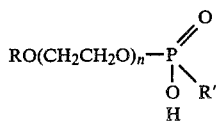

wherein R may be alkaryl groups such as octylphenyl, nonylphenyl, dinonylphenyl and dodecylphenyl, branched alkyl groups having at least 7 carbon atoms and normal alkyl groups having at least 10 carbon atoms; n may be a positive integer of from 1 to 33; and R' may be $RO(CH_2CH_2O)_n$— or hydroxyl group.

The esters may be prepared by reacting organic hydroxyl compounds with phosphorous pentoxide to form a uniform mixture of mono- and diesters of phosphoric acid. The organic hydroxyl compounds are non-ionic surfactants made by condensing an alkylene oxide with an organic alcohol or phenol. The continuous preparation of mixtures of mono- and diesters of phosphoric acid is described in U.S. Pat. No. 3,776,985, the disclosure of which is incorporated herein by reference. In general the esters have the configuration of a condensation product of at least one mole of an alkylene oxide, preferably ethylene oxide, with one mole of a compound containing at least 5 carbon atoms and a reactive hydrogen atom; such as the alkylated and polyalkylated phenols, multi-branched chain primary aliphatic alcohols, and straight chain aliphatic alcohols having at least 10 carbon atoms.

The phenols and alcohols are preferably condensed with from 1 to 33 moles ethylene oxide. The condensation products are then esterified to the mono- and diesters of phosphoric acid. Commerical mixtures of said mono- and diesters are sold under the tradename "GAFAC" by GAF Corporation and "TRYFAC" by Emery Industries, Inc.

The esters are added to the polymer particles by dry blending in a suitable mixer. Best results are obtained when amounts of ester between 0.01 and 0.04 parts per 100 parts of polymer are added. Less than 0.01 part of ester does not give sufficiently low lumping properties and greater than 0.04 part of ester serves no useful purpose and increases the cost of the products. Amounts as high as 0.1 parts can be used, but the beads become sticky and do not flow as freely as desired. The esters may be used alone, but are preferably used in connection with another antilumping agent such as calcium aluminosilicate or zinc stearate.

The specific type of blender used is not critical, as long as the mixing is thorough. Mixing times of from 15 seconds to one hour may be used, depending on the type of blender. Various high intensity mixers may be used as can low intensity ribbon blenders.

The invention is further illustrated by the following examples wherein parts are by weight unless otherwise indicated.

EXAMPLE I

To a ribbon-type blender was added 20 pounds of a flame-retardant grade of expandable polystyrene beads (previously dry-mixed with 0.05% of a finely divided calcium aluminosilicate) having a particle size of predominantly through 16 and on 35 mesh, U.S. Standard Sieve, containing 6.5 percent n-pentane blowing agent and 0.03 wt. %, based on polystyrene, of the commercial phosphate esters shown in Table I. All three commercial esters are proprietary mixtures of the mono- and diesters. The mixture was blended for 2 minutes in one direction and 2 minutes in the reverse direction to insure complete dry-blending.

The beads were then expanded batchwise in a 55-gallon stirred tank until the foam flowed out of the chute. Inlet steam pressure was 7 psig, and the foam bed temperature was 211° F. (99.4° C.). The % lumps was determined by screening the pre-expanded beads through a 4 mesh sieve. The wall coating is comprised of adherent foam particles in the form of stratified "doughnuts" in zones of the pre-expander that are not swept by the agitator bars. Results are shown in Table I.

TABLE I

| Additive, 0.03% | | | Batch Expansion | | |
|---|---|---|---|---|---|
| Supplier | Name | Structure[1] (R in hydrophobe) | Foam Density pcf. | Lumps, % | Wall Coating Thickness, in. |
| | None | | 1.25 | 0.54 | 1.0 |
| Emery Industries | Tryfac 5556 | Nonylphenyl | 1.22 | 0.14 | 0.0 |
| GAF Corp. | GAFAC RE-610 | Nonylphenyl | 1.33 | 0.12 | 0.5 |
| GAF | Gafac | Branched | 1.26 | 0.03 | 0.1 |

TABLE I-continued

| | Additive, 0.03% | | Batch Expansion | | |
|---|---|---|---|---|---|
| Supplier | Name | Structure[1] (R in hydrophobe) | Foam Density pcf. | Lumps, % | Wall Coating Thickness, in. |
| Corp. | RS-610 | Aliphatic | | | |

[1]Monoester

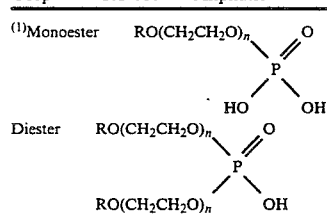

Diester

R = alkyl or alkylaryl radical
n = average number of ethylene oxide radicals reacted with one mole of hydrophobe It can be seen from the table that all these commercial additives gave greatly improved stratification properties and also reduced the lumping of the products.

EXAMPLE II

To illustrate the antistratification properties of the phosphate esters in the *continuous* pre-expansion of expandable polystyrene beads, eight 20-pound batches of similar beads were dry-blended with 0.03 wt. % GAFAC RS-610 (see Table I for structure) in a ribbon blender as in Example I. These eight batches were co-mingled by blending in a drum tumbler. The comingled beads were then fed at a rate of about 320 pounds per hour to the bottom of a 200 gallon stirred tank expander in the presence of steam under 10 psig pressure to yield lump-free foam particles with a bulk density of 1.08 pcf. The pre-expanded beads were allowed to age one day, and then molded into insulation board foam billets approximately 20×25×98 inches using steam at a header pressure of 20 psig and foam back pressure of 14 psig. Results are given in Table II, along with those of similar beads not containing the GAFAC.

TABLE II

| | With 0.03% GAFAC RS-610 | Without GAFAC RS-610 |
|---|---|---|
| Expansion | | |
| Feed Rate, lb/hr | 321 | 327 |
| Density, lb/ft³ | 1.08 | 1.08 |
| Wetness | Medium | Medium |
| Stratification | Nil | 7 inches |
| Billet Molding and Testing | | |
| Cool Time, min. | 10 | 10 |
| Face Collapse, in. | 5/16, 3/16 | 5/16, 7/32 |
| Length Shrinkage, in. | 9/16 | 9/16 |
| Fusion, % | 37 | 38 |
| Wire-Cutting | Good | Good |
| Wire-cut surface | Good | Good |

As can be seen from the result, the untreated beads expanded lump-free, but left stratified foams as thick as 7 inches in the form of a doughnut on the wall of the expander. The beads blended with 0.03 wt. % of GAFAC-RS610 left no measurable build-up of stratification. Billets molded from these foams were indistinguishable in terms of molding characteristics, molded foam dimensions, and particle-to-particle fusion.

I claim:

1. A composition comprising a styrene polymer containing dispersed throughout 3 to 20 weight percent of a blowing agent and coated on the surface thereof by 0.01 to 0.04 weight percent of a mixture of esters having general formula

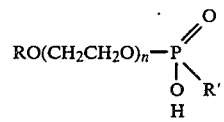

wherein R may be alkaryl groups, branched alkyl groups having at least 7 carbon atoms, or normal alkyl groups having at least 10 carbon atoms; n may be a positive integer of from 1 to 33; and R' may be $RO(CH_2CH_2O)_n$— or hydroxyl group.

2. The composition of claim 1 wherein the styrene polymer is polystyrene.

3. The composition of claim 1 wherein the styrene polymer is a copolymer of styrene with minor amounts of acrylonitrile.

4. The composition of claim 1 wherein the styrene polymer is a copolymer of styrene with minor amounts of maleic anhydride.

5. The composition of claim 1 wherein the styrene polymer is a copolymer of styrene with minor amounts of methyl acid maleate.

* * * * *